United States Patent
Hirai et al.

(10) Patent No.: US 8,084,275 B2
(45) Date of Patent: Dec. 27, 2011

(54) MAGNETIC COMPOSITE BODY, PRODUCTION METHOD THEREOF, METHOD FOR REMOVING SUBSTANCE WITH MANNOSE ON ITS SURFACE, AND METHOD FOR CONCENTRATING SUBSTANCE WITH MANNOSE ON ITS SURFACE

(75) Inventors: Hiroyuki Hirai, Ashigarakami-gun (JP); Masayoshi Kojima, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1118 days.

(21) Appl. No.: 11/883,742

(22) PCT Filed: Feb. 8, 2006

(86) PCT No.: PCT/JP2006/002584
§ 371 (c)(1),
(2), (4) Date: Aug. 6, 2007

(87) PCT Pub. No.: WO2006/085668
PCT Pub. Date: Aug. 17, 2006

(65) Prior Publication Data
US 2008/0156736 A1     Jul. 3, 2008

(30) Foreign Application Priority Data
Feb. 8, 2005 (JP) .................. 2005-032074

(51) Int. Cl.
*G01N 33/553* (2006.01)
*B01D 35/06* (2006.01)
*G01N 25/18* (2006.01)

(52) U.S. Cl. .................. 436/526; 436/149; 210/695

(58) Field of Classification Search .................. None
See application file for complete search history.

(56) References Cited

U.S. PATENT DOCUMENTS

| | | | |
|---|---|---|---|
| 4,452,773 A | 6/1984 | Molday |
| 4,935,147 A | 6/1990 | Ullman et al. |
| 5,108,933 A | 4/1992 | Liberti et al. |
| 5,242,833 A | 9/1993 | Lawlor et al. |
| 5,422,279 A | 6/1995 | Lawlor et al. |
| 5,431,720 A | 7/1995 | Nagai et al. |
| 5,693,784 A | 12/1997 | Ekenberg |
| 5,733,538 A | 3/1998 | Riffle |
| 5,916,539 A | 6/1999 | Pilgrimm |
| 6,099,895 A | 8/2000 | Mayo et al. |
| 6,548,264 B1 | 4/2003 | Tan et al. |
| 7,169,618 B2 | 1/2007 | Skold |
| 7,175,909 B2 | 2/2007 | Hu et al. |

| | | |
|---|---|---|
| 2002/0177143 A1 | 11/2002 | Mirkin et al. |
| 2004/0247503 A1 | 12/2004 | Hyeon |
| 2005/0037504 A1 | 2/2005 | DiMagno et al. |
| 2006/0194887 A1 | 8/2006 | Kojima et al. |

FOREIGN PATENT DOCUMENTS

| | | |
|---|---|---|
| EP | 0 125 995 A2 * | 11/1984 |
| EP | 0 230 768 | 8/1987 |
| EP | 0 718 675 | 6/1996 |
| EP | 1 617 220 | 1/2006 |
| JP | 05-080058 | 3/1993 |
| JP | 06-213900 | 8/1994 |
| JP | 07-159410 | 6/1995 |
| JP | 08-178931 | 7/1996 |
| JP | 09-040962 A | 2/1997 |
| JP | 2002-60436 A * | 2/2002 |
| JP | 2002-165591 A * | 6/2002 |
| JP | 2003-533363 | 11/2003 |
| JP | 2004-305055 | 11/2004 |
| JP | 2005-237247 | 9/2005 |
| WO | 90/06042 A2 * | 6/1990 |
| WO | 99/62079 A1 * | 12/1999 |
| WO | WO 01/88540 | 11/2001 |
| WO | 02/16571 A1 * | 2/2002 |
| WO | WO 02/16528 | 2/2002 |
| WO | WO 03/008539 | 1/2003 |
| WO | WO 2004/092732 | 10/2004 |

OTHER PUBLICATIONS

JP 2002-165591 (Publication number) machine translation from Searching PAJ website, http://www19.ipdl.inpit.go.jp/PA1/cgi-bin/PA1INIT?1175358331875.*

PCT/ISA/210 and PCT/ISA/237 for PCT/JP2006/302584 dated May 23, 2006.*

(Continued)

*Primary Examiner* — P. Kathryn Wright
*Assistant Examiner* — Neil N Turk
(74) *Attorney, Agent, or Firm* — Buchanan Ingersoll & Rooney PC

(57) ABSTRACT

A magnetic composite body comprising magnetic nanoparticles having a number average particle diameter of 1 to 50 nm and having a compound represented by formula (I) fixed on their surfaces, and a method comprising bringing the magnetic composite body into contact with a test piece followed by magnetic separation:

$$R^1O-(CH(R^2)CH_2O)_n-L-X \quad \text{Formula (I)}$$

wherein $R^1$ represents a hydrogen atom, an alkyl or alkenyl group having a carbon chain length of 1 to 20, or a substituted or unsubstituted, aryl or heterocyclic group; $R^2$ represents a hydrogen atom or a methyl group; L may be present or not present, and, when L is present, L represents an alkylene or alkenylene group having a carbon chain length of 1 to 10 which may have a branched chain or a substituent; X represents a hydrogen atom, a carboxylic acid group, a phosphoric acid group, or a sulfonic acid group; and n represents an integer of 1 to 10.

15 Claims, No Drawings

OTHER PUBLICATIONS

Gupta et al., "Synthesis and Surface Engineering of Iron Oxide Nanoparticles for Biomedical Application" Biomaterials, 2005, vol. 26, No. 18, pp. 3995-4021, XP-004697279.

Langlois et al., "Historical Milestones in Measurement of HDL-cholesterol Impact on Clinical and Laboratory Practice" Clinica Chimica Acta, 2006, vol. 369, No. 2, pp. 168-178, XP-005516966.

Non-Final Office Action issued on May 27, 2009 in U.S. Appl. No. 11/919,869.

Final Office Action issued on Nov. 30, 2009 in U.S. Appl. No. 11/919,869.

Office Communication issued on Apr. 2, 2010 in U.S. Appl. No. 11/919,869.

Bio Industry, 2004, vol. 21, No. 8, pp. 39-47 (in Japanese, partial English language translation).

Bio Industry, 2004, vol. 21, No. 8, pp. 31-38 (in Japanese, partial English language translation).

* cited by examiner

MAGNETIC COMPOSITE BODY, PRODUCTION METHOD THEREOF, METHOD FOR REMOVING SUBSTANCE WITH MANNOSE ON ITS SURFACE, AND METHOD FOR CONCENTRATING SUBSTANCE WITH MANNOSE ON ITS SURFACE

TECHNICAL FIELD

The present invention is related to magnetic composite body, a production method thereof, a method for removing a substance with mannose on its surface, and a method for concentrating a substance with mannose on its surface. The invention is related particularly to magnetic composite body having surfaces modified by a specific compound and having excellent dispersion stability in water, a method using the magnetic composite body to remove a substance with mannose on its surface, and a method using the magnetic composite body to concentrate a substance with mannose on its surface.

BACKGROUND ART

Recently, magnetic particles have been proposed as means for collecting a target substance efficiently. Since magnetic particles can be collected easily and efficiently by using an external magnetic field, they are used as accurate detection means in methods for detecting biological substances and the like. In order to surely collect a target substance of very small size in a microenvironment, such as a virus molecule in an organism, the surface area of the nanoparticles for collection has to be large. Therefore, vaccines and methods for separating, concentrating, or detecting viruses have been proposed which use small-sized nanoparticles (See, for example, "Biomaterial-Seitaizairyou" vol. 22, no. 6 (2004), pp. 394-399). Japanese Patent Application Laid-Open (JP-A) No. 2002-165591 discloses adsorption of viruses by magnetic particles which have lectin on its surface and which consist of polymer particles containing a magnetic material in their interior portions.

However, when the particle diameter of the magnetic particles to be used is large, the amount of the adsorbed target substance and the analysis sensitivity are insufficient though the magnetic particles show better response to magnet. In contrast, when the particle diameter is not larger than several tens of nanometers, the magnetic particles show inferior response to magnet; therefore accurate analysis is difficult.

In order to provide magnetic nanoparticles of nano-class which can surely respond to an external magnetic field, it has been proposed to aggregate the magnetic nanoparticles by using a polymer having a lower critical solution temperature (LCST) or an upper critical solution temperature (UCST) (See, for example, International Publication No. 02/16571 pamphlet and JP-A No. 2002-60436).

DISCLOSURE OF INVENTION

However, when such a heat-stimulus-responsive polymer or the like is used for the collection of a target substance, there may be a problem of the reduction of separation and refinement efficiency owing to a non-specific interaction between the target substance (such as a virus) and the polymer chain.

If there is a versatile magnetic nanomaterial which has ability to trap specific target substances in various applications through easy treatments, in addition to the ability to trap viruses, then the magnetic nanomaterial can be used for many applications in which highly sensitive analysis and the like have to be conducted in a short time.

The magnetic nanomaterial of the present invention is a magnetic composite body comprising magnetic nanoparticles having a number average particle diameter of 1 to 50 nm, and at least one compound represented by the following formula (I) fixed on the surfaces of the magnetic nanoparticles.

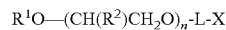

$$R^1O-(CH(R^2)CH_2O)_n\text{-}L\text{-}X \quad \text{Formula (I)}$$

In formula (I), $R^1$ represents a hydrogen atom, an alkyl or alkenyl group having a carbon chain length of 1 to 20, or a substituted or unsubstituted, aryl or heterocyclic group; $R^2$ represents a hydrogen atom or a methyl group; L may be present or not present, and, when L is present, L represents an alkylene or alkenylene group having a carbon chain length of 1 to 10 which may have a branched chain or a substituent; X represents a hydrogen atom, a carboxylic acid group, a phosphoric acid group, or a sulfonic acid group; and n represents an integer of 1 to 10.

The term "fixed" used herein refers to the fixation on the surface of the magnetic nanoparticles owing to physical adsorption (such as van der Waals' force) and/or chemical adsorption by chemical bonding. The chemical adsorption may involve a covalent bond, an ionic bond, a hydrogen bond, or a combination of one or more of such bonds.

The surfaces of the magnetic nanoparticles in the magnetic composite body preferably further have at least one compound fixed thereon selected from a polyvalent carboxylic acid, an amino acid, a protein, a peptide, and a polysaccharide.

In a preferable embodiment, a compound having affinity for the target substance is bound to the magnetic composite body via at least one compound selected from the compound represented by formula (I), the polyvalent carboxylic acid, the amino acid, the protein, the peptide, or the polysaccharide. The scope of the term "bond", "bonding", or "bound" used herein include chemical bonds such as covalent bonds, ionic bonds, and hydrogen bonds, as well as physical bonds such as bonds involving van der Waals forces. The bond is more preferably a chemical bond.

The magnetic nanoparticles are preferably iron oxide nanoparticles or ferrite nanoparticles.

The method of the invention for removing a substance (target substance) with mannose on its surface comprises: bringing magnetic composite body to which a compound having affinity to a target substance is bound into contact with a test sample which possibly contains a substance with mannose on its surface so as to bond the substance with mannose on its surface to the magnetic composite body; and removing the substance with mannose on its surface bonded to the magnetic composite body from the test sample by magnetic separation.

The method of the invention for concentrating the substance (target substance) with mannose on its surface comprises: bringing magnetic composite body to which a compound having affinity for a target substance is bound into contact with a test sample which possibly contains a substance with mannose on its surface so as to bond the substance with mannose on its surface to the magnet composite body; and collecting the substance with mannose on its surface bonded to the magnetic composite body by magnetic separation.

In the invention, when the magnetic nanoparticles are treated with a compound of formula (I) (hereinafter referred to as "surface modifying agent of the invention"), preferably in the presence of at least one compound selected from a polyvalent carboxylic acid, an amino acid, a protein, a peptide, and a polysaccharide, the surfaces of the magnetic nanoparticles become polyfunctional surfaces which can bind to various molecules densely, and are capable of binding to compounds having affinity for various target substances, whereby the dispersibility and stability of the magnetic composite body itself in water solvent are improved.

As a result, the target substance binds to plural particles of the magnetic composite body, whereby the response to the external magnetic field is improved. Accordingly, the magnetic composite body having the target substance bound thereto can be separated from the test sample and collected without the necessity for a special aggregation process or the like.

The present invention further provides a sample that is free from the substance with mannose on its surface. The sample can be prepared by the above-described method for removing a substance with mannose on its surface.

The present invention further provides a method for producing a magnetic composite body. The method comprises treating surfaces of magnetic nanoparticles having a number average particle diameter of 1 to 50 nm in the presence of a compound represented by formula (I). The treatment on the surfaces of the magnetic nanoparticles may be conducted in the presence of an additional compound selected from a polyvalent carboxylic acid, an amino acid, a protein, a peptide, or a polysaccharide.

According to the invention, a useful magnetic nanomaterial is provided which can be used in various areas and which realizes highly sensitive analysis conducted in a short time. The invention also provides a method for removing a target substance and a method for concentrating a target substance which are capable of separating, collecting, or concentrating the specific target substance (such as virus) in a microenvironment easily in a short time with high sensitivity. The invention further provides a magnetic nanomaterial usable in the methods.

BEST MODE FOR CARRYING OUT THE INVENTION

The magnetic composite body of the invention comprises magnetic nanoparticles having a number average particle diameter of 1 to 50 nm, and a compound represented by formula (I) fixed on the surfaces of the magnetic nanoparticles.

(1) Magnetic Nanoparticles

The magnetic nanoparticles of the invention are nanoparticles having magnetism and a number average particle diameter of 1 to 50 nm. Since the number average particle diameter is 1 nm or larger, the magnetic nanoparticles can be produced stably. Since the number average particle diameter is 50 nm or smaller, for example, the magnetic nanoparticles can penetrate into the interior of cells to trap the target substance when the target substance is a substance inside the cells. Since the magnetic nanoparticles have a large specific surface area, the reaction efficiency of the magnetic particles is high, and the magnetic particles are capable of quickly collecting a trace amount of the target substance. The number average particle diameter of the magnetic nanoparticles is preferably 3 to 50 nm (more preferably 5 to 40 nm) from the viewpoints of the stability of the crystal and the magnetic response.

The magnetic nanoparticles can be produced, for example by the methods disclosed in Japanese Patent Application National Publication No. 2002-517085, the disclosure of which is incorporated herein by reference. The magnetic nanoparticles can be produced, for example by: putting an aqueous solution containing an iron (II) compound or containing an iron (II) compound and a metal (II) compound under an oxidative condition required for the formation of a magnetic oxide, and then maintaining the pH value of the aqueous solution at 7 or higher to form iron oxide magnetic nanoparticles or ferrite magnetic nanoparticles. As an alternative, the magnetic nanoparticles can be produced by mixing a first aqueous solution containing a metal (II) compound and a second aqueous solution containing an iron (III) compound under an alkaline condition. The method described in *Biocatalysis*, vol. 5 (1991) pp. 61 to 69 (the disclosure of which is incorporated herein by reference) is also usable for the production of the magnetic nanoparticles.

In the invention, the magnetic nanoparticles are preferably selected from metal oxide magnetic nanoparticles, more preferably selected from an iron oxide magnetic nanoparticles and a ferrite ($(Fe, M)_3O_4$) magnetic nanoparticles. The metal oxide may be magnetite, maghemite, or a mixture magnetite and maghemite. The magnetic nanoparticles may have a core-shell structure in which the surface and the interior have different compositions. In the above formula, M represents a metal iron which is capable of forming a magnetic metal oxide when used in combination with iron ions. The metal represented by M is typically selected from transitional metals, and is preferably $Zn^{2+}$, $Co^{2+}$, $Mn^{2+}$, $Cu^{2+}$, $Ni^{2+}$, $Mg^{2+}$, or the like. The molar ratio of M to Fe (M/Fe) is determined based on the stoichiometric composition of the selected ferrite. The metal can be supplied in the form of a solid or a liquid, and is preferably a chloride, a bromide, or a sulfate. The magnetic nanoparticles are preferably iron oxide magnetic nanoparticles.

For example, when magnetite is formed, the aqueous solution preferably contains iron ions of two different oxidation states (namely, $Fe^{2+}$ and $Fe^{3+}$). The coexistence of iron ions of the two different oxidation states can be achieved by:

(a) adding a mixture of a Fe(II) salt and a Fe(III) salt to an aqueous solution preferably such that the molar ratio of Fe(II) salt to Fe(III) salt in the mixture is somewhat higher than the molar ratio calculated from the composition of the target magnetic oxide; or (b) adding a Fe(II) salt or a Fe(III) salt to an aqueous solution and converting a part of $Fe^{2+}$ ions or $Fe^{3+}$ ions to the other oxidation state preferably by oxidation (occasionally by reduction).

It is preferable to subject the magnetic metal oxide to aging at a temperature of 30 to 350° C. (preferably 50 to 300° C.).

The pH value of the solution has to be 7 or higher in order to allow the reaction between various metal ions required for the formation of a magnetic metal oxide to occur. The pH value of the solution can be set in a desired range by using an appropriate buffer solution as the solution for the addition of the first metal salt, or by adding a base to the solution after the required oxidation state is achieved. Once the pH value is set at a specific value which is in the range of 7 or higher, it is preferable to maintain the specific pH value throughout the preparation process of the magnetic nanoparticles so as to ensure that the size distribution of the finally-obtained magnetic particles is substantially uniform.

An additional metal salt may be added to the solution in order to control the particle diameter of the magnetic nanoparticles. This addition may be conducted by any of the following two procedures (a) and (b).

Procedure (a): In this procedure, the components are added stepwise. Thus, this procedure is called "stepwise addition procedure" hereinafter. In a cycle of this procedure, the respective components (metal salts, oxidizing agents and bases) are added to the solution separately in a predetermined order. This cycle is repeated until the size of the nanoparticles reaches the desired size. The amounts of component to be added are preferably constant in the respective cycles, and are such amounts as not to cause the polymerization of the metal ions in the solution except for the surface of the growing particles.

Procedure (b): In this procedure, the addition is conducted continuously. This procedure is called "continuous addition procedure." In this procedure, the components (metal salts, oxidizing agents, and bases) are continuously added to the solution respectively at such substantially constant flow rates as not to cause the polymerization of the metal ions in the solution except for the surface of the growing particles.

By using the stepwise or continuous addition procedure, magnetic nanoparticles having a narrow size distribution can be formed.

(2) Surface Modifying Agent

The magnetic composite body of the invention is obtained by fixing a compound represented by formula (I) (surface modifying agent) on the surfaces of magnetic nanoparticles.

$$R^1O-(CH(R^2)CH_2O)_n-L-X \qquad \text{Formula (I):}$$

In formula (I), $R^1$ represents a hydrogen atom, an alkyl or alkenyl group having a carbon chain length of 1 to 20, or a substituted or unsubstituted, aryl or heterocyclic group. The alkyl or alkenyl group having a carbon chain length of 1 to 20 may be substituted by a carboxyl, hydroxyl or alkoxyl group, and may have a branched chain. Substituents on the aryl or heterocyclic group may be selected, for example from carboxyl groups, hydroxyl groups, alkyl groups each having a carbon chain length of 1 to 10, amd an alkoxyl group each having a carbon chain length of 1 to 10. From the viewpoint of the dispersion stability in an aqueous medium, the hydrophobic group represented by $R^1$ is preferably a hydrogen atom, an alkyl or alkenyl group having a carbon chain length of 1 to 20 carbon atoms, a non-substituted or substituted carboxyl group, a hydroxyl group, or a phenyl group substituted by an alkyl or alkoxyl group having a carbon chain length of 1 to 10. These alkyl groups, alkenyl groups, and alkoxyl groups themselves may be substituted, for example by carboxyl groups or hydroxyl groups.

In formula (I), $R^2$ represents a hydrogen atom or a methyl group. $R^2$ is preferably a hydrogen atom from the viewpoint of dispersion stability.

L may be present or not present. When L is present, L represents an alkylene or alkenylene group having a carbon chain length of 1 to 10. L is preferably an alkylene group having a carbon chain length of 1 to 2 from the viewpoint of dispersion stability. The alkylene or alkenylene group may have a substituent or a branched chain, and the branched chain may be, for example, a methyl group.

In formula (I), X represents an acidic group selected from a hydrogen atom, a carboxylic acid group, a phosphoric acid group, and a sulfonic acid group. The acidic group represented by X is preferably a carboxylic acid group since the carboxylic group can easily bind to a molecule selected from various molecules. The acidic group may be neutralized with an alkali metal salt or an ammonium salt from the viewpoint of the solubility in an aqueous medium. The alkali metal salt or ammonium salt used for the neutralization may be, for example, a sodium salt, a potassium salt, a NH$_4$ salt, or a tetramethylammonium salt.

In formula (I), n represents an integer of 1 to 10; n preferably represents an integer of 1 to 6 from the viewpoint of magnetic separability. Only one surface modifying agent according to the invention may be used, or a combination of two or more surface modifying agents according to the invention may be used.

Preferable examples of the surface modifying agent according to the invention include the compounds shown below, which should not be construed as limiting the invention. Exemplary compound (4) shown below corresponds to the case where n in formula (I) is 4.5, which means an equimolar mixture of the compound of formula (I) where n=5 and the compound of formula (I) where n=4.

(1)

(2)

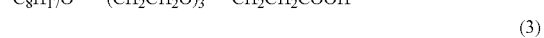
(3)

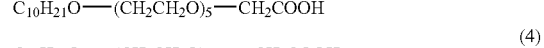
(4)

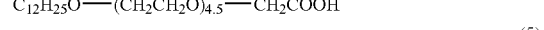
(5)

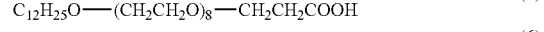
(6)

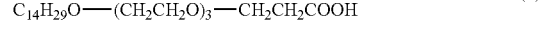
(7)

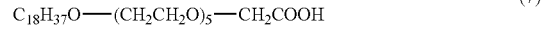
(8)

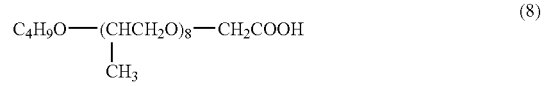
(9)

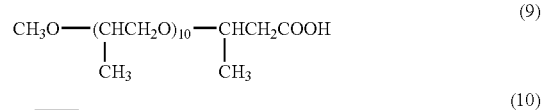
(10)

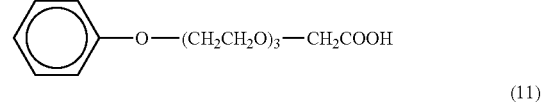
(11)

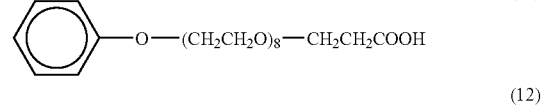
(12)

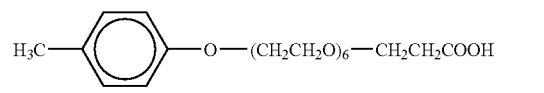
(13)

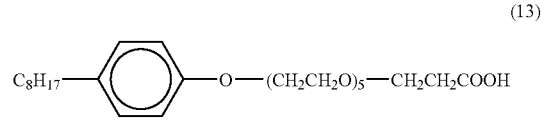
(14)

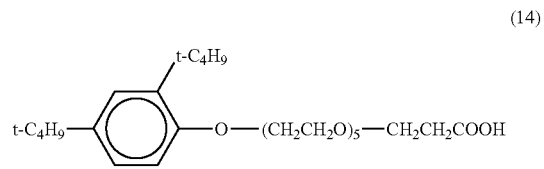
(15)

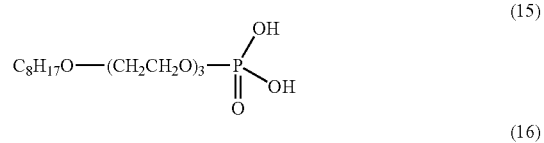
(16)

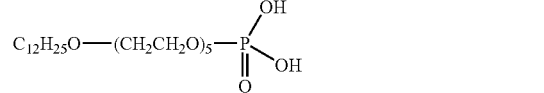
(17)

-continued

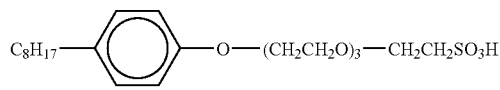 (18)

 (19)

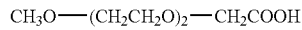 (20)

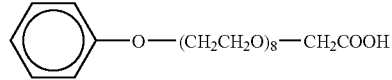 (21)

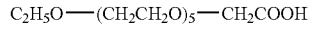 (22)

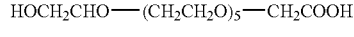 (23)

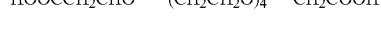 (24)

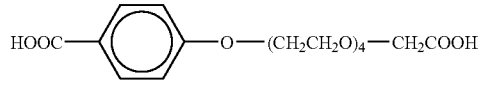 (25)

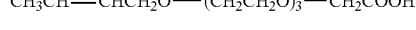 (26)

 (27)

Among the above compounds, the surface modifying agent is preferably selected from compounds (1) to (14) and (20) to (27) since they enables easy binding of a compound having affinity for a target substance to the magnetic nanoparticles.

In the present invention, one or more compounds selected from polyvalent carboxylic acids, amino acids, proteins, peptides, and polysaccharides, may be used as surface modifying agents, in addition to the compound represented by formula (I); as a result, the surfaces of the resultant particles of the magnetic composite body have such biocompatible compound(s) fixed thereon, and thus are polyfunctional surfaces capable of binding to various molecules at high density and are capable of binding to compound having affinity for various substances. The magnetic composite body, therefore, has improved dispersibility and stability in water solvent.

Examples of the polyvalent carboxylic acids include citric acid, tartaric acid, and malic acid. Examples of the amino acids include α-amino acids such as glycine, serine, lysine, arginine, aspartic acid, and glutamic acid, β-amino acids such as β-alanine, γ-amino acids such as GABA, and ω-amino acids. Examples of the proteins include serum proteins such as antibodies, lectins, and albumins, caseins, and collagens. Examples of the peptides include polypeptides such as gelatin and partial hydrolysis products thereof, and oligopeptides, which have smaller molecular weights. Examples of the polysaccharides include a chondroitin sulfuric acid containing an acidic polysaccharide unit such as glucuronic acid, galacturonic acid, or iduronic acid, hyaluronic acid, heparin, and synthetic acidic polysaccharides such as carboxymethylcellulose. Only one of these compounds may be used, or two or more of these compounds may be used in combination. These examples should not be construed as limiting the invention.

In the present invention, the use of the surface modifying agent represented by formula (I) and other optional surface modifying agents provides a lot of functional groups on the magnetic nanoparticles and the functional groups are capable of being bonded to a compound (hereinafter referred to as "connector") having affinity for a target substance. The density of the functional groups disposed on the surfaces of the magnetic nanoparticles, which is determined based on the amount of the surface modifying agent added, is such an amount that the magnetic nanoparticles has a size sufficient for responding to an external magnetic field when the target substance is bonded to the functional groups via the connector. Accordingly, the density of the functional groups may be varied according to the types and sizes of the target substance and magnetic nanoparticles. The amount of the surface modifying agent bound to the surface of the particles can be determined by a chemical analysis, and a person skilled in the art is able to select an appropriate analysis method easily.

The surface modifying agent to be used in the invention can cover the surfaces of the magnetic nanoparticles densely. As long as the total amount of the surface modifying agent is sufficient, it does not matter whether the entire surfaces of the magnetic nanoparticles are coated with the surface modifying agent, or only a part of the surfaces of the magnetic nanoparticles is covered with the surface modifying agent. In the invention, only a single surface modifying agent may be used, or two or more surface modifying agents may be used in combination.

In the present invention, in addition to the above surface modifying agent, known surface modifying agents may be present during and/or after the synthesis of the magnetic nanoparticles. Examples of known surface modifying agent include polyethylene glycol, gluconic acid, hydroxypropionic acid, trioctyl phosphine, trioctyl phosphine oxide, sodium polyphosphate, and sodium bis(2-ethylhexyl)sulfosuccinate.

The amount of the surface modifying agent of the invention to be added may be changed according to the particle diameter of the magnetic nanoparticles, the density of the magnetic nanoparticles, the type (size, structure, and the like) of the surface modifying agent, the type and size of the target substance, and the like. The molar ratio of the surface modifying agent of the invention to the magnetic nanoparticles is preferably 0.001 to 10, more preferably 0.01 to 2. When the amount of the surface modifying agent to be added is in the above range, the total size of the particles upon binding to the target substance is a size (for example, 0.05 µm to 10 µm) which can respond to an external magnetic field; accordingly, the particles in a dispersed state can respond to the external magnetic field.

In the invention, the molar ratio of the polyvalent carboxylic acid, amino acid, protein, peptide, polysaccharide, and the like as additional surface modifying agents to the magnetic nanoparticles is preferably 0.001 to 10, more preferably 0.01 to 2.

The surface modifying agent according to the invention may be added during and/or after the synthesis of the magnetic nanoparticles. The surface modifying agent covers at least a part of the surfaces of the magnetic nanoparticles. In other words, the surfaces of the magnetic particles are subjected to surface modification at least partially. When the surface modifying agent is added after the synthesis of the magnetic nanoparticles, it is preferable to purify the magnetic nanoparticles by magnetic separation. However, in an embodiment, the magnetic particles are cleaned and purified by an ordinary method such as ultracentrifugation or filtration. The purified magnetic nanoparticles may be dispersed in a solvent containing the surface modifying agent to be used in the invention, so as to be coated with the surface modifying agent. The solvent is preferably water or a hydrophilic organic solvent such as methanol, ethanol, isopropyl alcohol, or 2-ethyoxyethanol. When the surface modifying agent is added during the synthesis of the magnetic nanoparticles, the magnetic nanoparticles may be purified by a known method such as magnetic separation, ultracentrifugation, ultrafiltration, gel filtration or electrophoresis.

The coating of the surfaces of the magnetic nanoparticles with the surface modifying agent can be confirmed by chemical analysis, or can be confirmed if a constant space between the particles is observed under a high-resolution TEM such as a FE-TEM.

The magnetic nanoparticles coated with the surface modifying agent represented by formula (I) are activated, so that the surface modifying agent is bonded to the connector through an amidation reaction or the like using, as a reactive group: X in formula (I), which is a terminal group of the surface modifying agent; or a hydroxyl or carboxyl group as a substituent. A polyvalent carboxylic acid, an amino acid, a protein, a peptide, or a polysaccharide can be bonded to the connector, using its polyfunctional group as a reactive group as described above.

The amidation reaction is conducted by condensatioin between an amino group and a carboxyl group or a derivative (an ester, an acid anhydride, or an acid halide) of a carboxyl group. When an acid anhydride or an acid halide is used, it is preferable to make a base exist in the amidation reaction system. When an ester such as a methyl or ethyl ester of a carboxylic acid is used, it is preferable to heat the reaction system and/or to reduce the pressure so as to remove the generated alcohol. In an embodiment, a carboxyl group is subjected to direct amidation, and one or more substances selected from amidation agents such as DCC, Morpho-CDI, and WSC, condensation additives such as HBT, and substances which can accelerate the amidation reaction such as active ester agents (for example, N-hydroxyphthalimide, p-nitrophenyltrifluoroacetate, and 2,4,5-trichlorophenol) are present in the amidation reaction, or are allowed to react in advance with a functional group such as X in formula (I) or the like. In a preferable embodiment, either amino or carboxyl group of the affinity molecule to be bonded to the surface modifying agent through amidation is protected, upon amidation, by an appropriate protecting group according to an ordinary method, and deprotected after the amidation reaction.

After the connector is bound to the magnetic composite body through amidation, the magnetic composite body cleaned and purified by an ordinary method such as gel filtration, and then dispersed in water or in a hydrophilic solvent and used. The hydrophilic solvent is preferably methanol, ethanol, isopropanol, or 2-ethoxyethanol. The concentration of the magnetic composite body in the dispersion liquid is not particularly limited, and may be changed according to the types and concentrations of the target substance and connector. The concentration of the magnetic composite body in the dispersion liquid is preferably 1 M to $10^{-5}$ M, more preferably $10^{-1}$ M to $10^{-4}$ M.

The magnetic nanoparticles of the invention can acquire bondability to the target substance through the intermediation of the connector. The target substance and the connector can be changed suitably, depending on the application field of the magnetic composite body of the invention.

(3) Connector (Ligand)

The connector may be, for example, a biological molecule or an organic or inorganic compound having affinity for a biological molecule.

Examples of the combination of biological molecules which exhibit affinity interaction (ligand-target interaction) between the molecules include a combination of nucleic acid molecules which can hybridize each other, a combination of an antibody (monoclonal or polyclonal) with its antigen, a combination of an enzyme with its substrate, a combination of a nucleic acid molecule with a nucleic acid binding protein, and a combination of avidin with biotin. Examples of the biological molecule as the ligand include affinity molecules such as nucleic acids, amino acids, peptides, proteins, and polysaccharides, and lipids.

When, for example, nucleic acids are used, transcriptional control elements which can control the transcription of a specific base sequence can be separated from various proteins quickly and easily. Further, the relationships between various substances, such as the strength of interaction, similarity in structure, and the like, can be recognized by using various substances.

The scope of the term "nucleic acids" includes PNA (Peptide Nucleic Acid), in addition to deoxyribonucleic acid (DNA) and ribonucleic acid (RNA). The scope of RNA includes mRNA, tRNA, and rRNA. The scope of DNA and RNA includes fragments of DNA or RNA, as well as the entire molecule of DNA or RNA.

In an embodiment, the target substance is a virus or an organism such as a bacterium, or a fragment of a virus or organism.

The connector usable in the invention is preferably a mannose-binding lectin from the viewpoint of trapping viruses in the test sample. HIV-1 as an example of virus has an envelope with a diameter of 100 nm, and the envelope contains glycoprotein gp120. Since the sugar chain portion of the gp120 contains a lot of mannose, the sugar chain portion strongly interact with the lectin capable of recognizing mannose.

In general, the mannose-binding lectin is a lectin capable of recognizing α-mannosyl residue, which is a constituent sugar of the mother nuclei of an asparagine-binding sugar chain. Examples of the mannose-binding lectin include Conavalia ensifornis (ConA), Lens culinaris (LCA), Bowringia midbraedii (BMA), Dolichos lablab (DLA), Galanthus nivalis (GNA), Gerardia savaglia (GSL), Machaerium biovulatum (MBA), Machaeriumu lunatus (MLA), Narcissus pseudonarcissus (NPA), Epipactis heleborine (EHA), and Listera ovata (LOA). From the viewpoints of function and economical efficiency, ConA (Concanavaline A) is preferable among mannose-binding lectins. For example, ConA purified from jack bean is usable.

The binding of the surface modifying agent fixed on the surface of the magnetic nanoparticles to the mannose-binding lectin compound is conducted, for example by the binding of a functional group [such as X in the surface modifying agent represented by formula (I)] to the mannose-binding lectin compound. The method for binding the mannose-binding lectin to the functional group corresponding to X in formula (I) may be any of cyanogen bromide activation method, condensation reagent method using carbodiimide agent or Woodward agent, diazo method using a diazonium compound, acid azide derivative method, acetyl halide derivative method, triazinyl derivative method, (meth)acrylic acid halide derivative method, and crosslinking method using a polyfunctional crosslinking agent such as glutaraldehyde or a compound whose both terminals are epoxydated. The mannose-binding lectin is bound to the surfaces of the magnetic nanoparticles directly or via a spacer.

The dispersion medium of thus obtained magnetic composite body having mannose-binding lectin bound thereto sometimes contains an emulsifying agent, a dispersant, an unreacted monomer, a water-soluble polymer or a decomposition product of a polymerization initiator. When, for example, the magnetic composite body is used in a medical diagnostic agent, such substances are likely to inhibit reaction at a nucleic acid amplification test step. Therefore, it is preferable to remove such substances from the dispersion medium of the magnetic composite body having mannose-binding lectin thereon by a method such as described in *Adv. Colloid Interface Sci.*, vol. 81, (1999), pp. 77-165.

In an embodiment, the binding of a virus to the magnetic composite body is achieved by mixing a predetermined amount of a dispersion liquid of the magnetic composite body with a test sample, and then allowing the reaction to proceed by vertically rotating the mixture at room temperature for about 10 minutes. Upon the reaction, the mixture may be provided with one or more selected from appropriate buffer solutions, appropriate chelating agents, and appropriate metal ions, in accordance with the virus concentration.

In the invention, the magnetic composite body having a mannose-binding lectin thereon described above may be used advantageously for the removing method and concentrating method of the target substance with mannose on its surface.

In the following, the method of the invention for removing a target substance with mannose on its surface is described.

The method for removing a target substance with mannose on its surface uses magnetic nanoparticles treated with the surface modifying agent and/or connector adapted for a substance with mannose on its surface as the target substance, the method comprising: bringing the magnetic composite body into contact with a test sample which possibly contains the target substance with mannose on its surface so as to bond the target substance to the magnetic composite body, and removing the target substance bonded to the magnetic composite body from the test sample by magnetic separation.

In this method, the magnetic nanoparticles of the invention treated with the surface modifying agent and/or the connector is used, and the magnetic composite body having the target substance bound thereto is subjected to magnetic separation in a state of being dispersed in the test sample, wherein the target substance has a surface containing mannose. Accordingly, the target substance with mannose on its surface can be removed efficiently from the test sample without the necessity for a separate process for improving the response of the magnetic nonomaterial to the external magnetic field such as an aggregation process.

The surface of the magnetic composite body obtained by treatment with the surface modifying agent may have the connector which is a compound having affinity for the target substance (substance with mannose on its surface). The type of the connector may be selected suitably in accordance with the type(s) of the target substance and/or of the test sample. A person skilled in the art is able to select such a suitable connector. The connector may be selected from the connectors described above.

The connector is preferably a compound having affinity for viruses, and may be a mannose-binding lectin. The lectin is preferably concanavalin A from the viewpoints of convenience and reactivity.

The virus as the target substance is not particularly limited, as long as the virus has affinity for mannose-binding lectin. Examples thereof include AIDS virus (HIV-1), hepatitis B virus, hepatitis C virus, adult T-cell leukemia virus, filo virus which causes Ebola hemorrhagic fever, and hantavirus which causes hemorrhagic fever with renal syndrome.

The test sample to be tested for the target substance may be, for example, a body fluid such as blood and lymph fluid, a culture fluid, or a liquid reagent.

The magnetic composite body having the target substance with mannose on its surface bound thereto is separated from the test sample by magnetic separation.

In the invention, magnetic separation comprises applying an external magnetic field to the test sample provided with the magnetic composite body. The magnetic composite body responds to the applied external magnetic field and is adsorbed on the wall in the measurement environment, whereby the magnetic composite body is easily separable from the test sample.

The strength of the external magnetic field is preferably 7.96 to 1592 kA/m (100 to 20000 Oe), more preferably 23.9 to 1274 kA/m (300 to 16000 Oe). When the strength of the external magnetic field is within the above range, the magnetic composite body having the target substance bound thereto is able to respond to the external magnetic field. The external magnetic field can be applied by using permanent magnet.

The magnetic separation may be conducted by allowing the test sample containing the magnetic composite body dispersed therein to pass through the external magnetic field at a constant velocity, or may be conducted by a batch treatment in a container.

When the magnetic composite body having the target substance with mannose on its surface is separated from the test sample by the magnetic separation and only the test sample is collected, the test sample free of the target substance with mannose on its surface can be obtained efficiently. This method for removing the target substance with mannose on its surface can be used for cleaning the test sample which is possibly contaminated with the target substance with mannose on its surface (for example, virus).

In the following, the method of the invention for concentrating a target substance with mannose on its surface is described.

The method comprises: bonding a target substance with mannose on its surface to the magnetic composite body; separating the magnetic composite body having the target substance bound thereto from the test sample by magnetic separation; and then collecting the magnetic composite body having the target substance bound thereto, similarly to the method for removing a target substance with mannose on its surface. The binding of the target substance to the magnetic composite body, and the separation of the magnetic composite body from the test sample may be conducted in the same manner as in the method for removing a target substance with mannose on its surface.

The magnetic composite body having the target substance with mannose on its surface bound thereto can be collected easily by stopping the application of the external magnetic field or shielding the magnetic composite body from the external magnetic field after the magnetic composite body having the target substance with mannose on its surface is separated from the test sample in the same manner as in the method for removing the target substance.

The collected specimen contains a high concentration of the magnetic composite body having the target substance with mannose on its surface bound thereto. Thus obtained concentrated solution of the magnetic composite body having the target substance with mannose on its surface is easy to handle since the magnetic composite body is adapted for magnetic separation. Accordingly, the concentrated solution may be used in various applications.

For example, when the target substance with mannose on its surface is a virus, the collected magnetic composite body having the virus bound thereto may be subjected to a heat treatment so as to deactivate the virus, whereby a vaccine can be produced. The vaccine comprising the magnetic composite body having the deactivated virus bound thereto may be administered via a transmucosal route such that antibodies (e.g. IgA) specific to the virus are introduced selectively.

A person skilled in the art is able to select an appropriate condition of the heating treatment and the like required for making vaccines.

In the method for removing a target substance with mannose on its surface and in the method for concentrating a target substance with mannose on its surface, the target substance has mannose on its surface, and may be a bacterium, mold, cell, or protein having mannose on its surface. Such a target having mannose on its surface can be concentrated and/or removed from a test sample which possibly contains the target.

EXAMPLES

In the following, Examples of the invention are described. However, Examples should not be construed as limiting the invention. In Examples, "%" refers to "% by weight (by mass)" unless otherwise mentioned.

Example 1

(Preparation of Magnetic Nanoparticle Dispersion Liquid)

10.8 g of iron(III) chloride hexahydrate and 6.4 g of iron(II) chloride tetrahydrate were dissolved in 80 ml of 1 mol/l (1N) hydrochloric acid aqueous solution, so that a mixture solution was obtained. 96 ml of 28% by weight ammonia water was added to the obtained solution at a rate of 2 ml/min while the solution was stirred. Thereafter, the solution was heated and maintained at 80° C. for 30 minutes, and then cooled to room temperature. The formed aggregates were purified with water by decantation. The formation of magnetite ($Fe_3O_4$) having a crystallite diameter of about 12 nm was confirmed by an X-ray diffraction method.

The aggregates were dispersed in 250 ml of an aqueous solution containing 2.3 g of polyoxyethylene (4.5) lauryl ether acetic acid (exemplary compound (4)) dissolved therein, so that a magnetic nanoparticle dispersion liquid A (with a Fe concentration of 13.2 g/L) was obtained. The dispersion liquid A was subjected to gel filtration, so that magnetite was separated. The collected magnetite was dried, and its infrared absorption spectrum was measured, whereby the fixation of exemplary compound (4) on magnetite was confirmed.

Example 2

A magnetic nanoparticle dispersion liquid B was prepared in the same manner as the preparation of the magnetic nanoparticle dispersion liquid A, except that 250 ml of the solution containing 2.3 g of polyoxyethylene (4.5) lauryl ether acetic acid dissolved therein used in the preparation of the magnetic nanoparticle dispersion liquid A was replaced with 250 ml of a solution containing 0.8 g of polyoxyethylene (2) methyl ether acetic acid (exemplary compound (20)) and 1.3 g of aspartic acid dissolved therein. Similarly to Example 1, the dispersion liquid B was subjected to gel filtration, so that magnetite was separated. The collected magnetite was dried, and its infrared absorption spectrum was measured, whereby the fixation of exemplary compound (20) and aspartic acid on magnetite was confirmed.

Example 3

A magnetic nanoparticle dispersion liquid C was prepared in the same manner as the preparation of the magnetic nanoparticle dispersion liquid A, except that 250 ml of the solution containing 2.3 g of polyoxyethylene (4.5) lauryl ether acetic acid dissolved therein used in the preparation of the magnetic nanoparticle dispersion liquid A was replaced with 250 ml of a solution containing 1.2 g of polyoxyethylene (8) phenyl ether acetic acid (exemplary compound (21)) and 0.3 g of chondroitin sulfuric acid dissolved therein. Similarly to Example 1, the dispersion liquid C was subjected to gel filtration, so that magnetite was separated. The collected magnetite was dried, and its infrared absorption spectrum was measured, whereby the fixation of exemplary compound (21) and chondroitin sulfuric acid on magnetite was confirmed.

Example 4

A magnetic nanoparticle dispersion liquid D was prepared in the same manner as the preparation of the magnetic nanoparticle dispersion liquid A, except that 250 ml of the solution containing 2.3 g of polyoxyethylene (4.5) lauryl ether acetic acid dissolved therein used in the preparation of the magnetic nanoparticle dispersion liquid A was replaced with 250 ml of a solution containing 0.8 g of polyoxyethylene (5) 2-hydroxyethoxy ether acetic acid (exemplary compound (23)) and 1.3 g of citric acid dissolved therein. Similarly to Example 1, the dispersion liquid D was subjected to gel filtration, so that magnetite was separated. The collected magnetite was dried, and its infrared absorption spectrum was measured, whereby the fixation of exemplary compound (23) and citric acid on magnetite was confirmed.

Example 5

Formation of Magnetic Nanoparticles bound to ConA

The magnetic nanoparticle dispersion liquid A was concentrated 2.5-fold by ultrafiltration. 0.75 ml of a 0.1 M MES buffer solution (pH 6.0), 1.8 mg of WSC (manufactured by Dojindo Laboratories), and 1.6 mg of sulfo-NHS were added to 0.25 ml of the concentrated dispersion liquid, and the mixture was allowed to react at room temperature for 30 minutes, thereby activating the carboxyl groups on the surfaces of the magnetic nanoparticles. 1.0 ml of a 0.1 M MES buffer solution (pH 6.0) containing 1.0 mg/ml of ConA (manufactured by Sigma-Aldrich Co.) was added to the above mixture, and the obtained mixture was allowed to react at 4° C. overnight. Then, the reaction solution was subjected to column chromatography with SEPHADEX G-100 to separate and purify the magnetic nanoparticles having ConA bound thereto. The amount of ConA bound to the purified magnetic nanoparticles was measured by BCA protein assay kit manufactured by Pierce Biotechnology Inc., and was found to be 27 mg per 1 g of the magnetic nanoparticles. With this amount of ConA, the magnetic particle is estimated to have a size of about 0.2 μm upon binding to HIV, thus able to respond to an external magnetic field sufficiently.

Example 6

The magnetic nanoparticles having ConA bound thereto were obtained using each of the magnetic nanoparticle dispersion liquids B to D, in the same manner as in Example 5. The ConA amounts bound to 1 g of the magnetic nanoparticles were 31 mg, 40 mg, and 33 mg, respectively in the cases where the magnetic nanoparticle dispersion liquids B, C, and D were used. These ConA binding amounts were greater than that achieved by the use of the magnetic nanoparticle dispersion liquid A.

The respective magnetic nanoparticle dispersion liquids were allowed to stand still, and their sedimentation properties were visually observed over time, thereby evaluating their dispersion stability. As a result, it was found that the magnetic nanoparticle dispersion liquids B to D were less likely to cause sedimentation than the magnetic nanoparticle dispersion liquid A, which means that the magnetic nanoparticle dispersion liquids B to D showed improved dispersion stability compared to the magnetic nanoparticle dispersion liquid A.

The magnetic nanoparticles having ConA bound thereto can be used for the separation and/or concentration of, for example, HIV-1 virus. Then, the concentrated magnetic nanoparticles having the virus bound thereto can be used as an AIDS vaccine.

Comparative Example

The operation of dispersing the magnetic nanoparticles used in Example 1 were